US009221514B2

(12) United States Patent
Scolari et al.

(10) Patent No.: US 9,221,514 B2
(45) Date of Patent: Dec. 29, 2015

(54) SCOOTER HAVING A GEARING SYSTEM

(71) Applicant: Zike, LLC, Greenville, SC (US)

(72) Inventors: Nathan A. Scolari, Greenville, SC (US); George Reiter, Taylors, SC (US)

(73) Assignee: Zike, LLC, Greenville, SC (US)

( * ) Notice: Subject to any disclaimer, the term of this patent is extended or adjusted under 35 U.S.C. 154(b) by 0 days.

(21) Appl. No.: 14/208,072

(22) Filed: Mar. 13, 2014

(65) Prior Publication Data

US 2014/0319795 A1 Oct. 30, 2014

Related U.S. Application Data

(60) Provisional application No. 61/787,133, filed on Mar. 15, 2013.

(51) Int. Cl.
*B62M 1/24* (2013.01)
*B62M 1/30* (2013.01)
*B62K 3/00* (2006.01)

(52) U.S. Cl.
CPC .............. *B62M 1/24* (2013.01); *B62K 3/002* (2013.01); *B62M 1/30* (2013.01)

(58) Field of Classification Search
CPC .......... B62K 3/002; B62M 1/24; B62M 1/26; B62M 1/28; B62M 1/30; B62M 1/32; B62M 1/36; B62M 9/04; B62M 9/06; B62M 11/00; B62M 11/04; B62M 25/02; B62M 25/04; B62M 2009/002; B62M 2700/003; B62M 2700/006
See application file for complete search history.

(56) References Cited

U.S. PATENT DOCUMENTS

| 4,828,284 | A | | 5/1989 | Sandgren |
| 4,880,249 | A | * | 11/1989 | Gray et al. ................... 280/253 |
| 5,335,927 | A | * | 8/1994 | Islas .............................. 280/255 |
| 6,340,067 | B1 | * | 1/2002 | Fujiwara et al. ........... 180/206.8 |
| 6,857,648 | B2 | * | 2/2005 | Mehmet ........................ 280/217 |
| 2002/0167150 | A1 | | 11/2002 | Clift, Jr. |
| 2003/0098566 | A1 | * | 5/2003 | Christensen et al. ......... 280/221 |
| 2008/0048412 | A1 | | 2/2008 | Dror |
| 2009/0194960 | A1 | | 8/2009 | Peterson |

(Continued)

FOREIGN PATENT DOCUMENTS

WO 2013013270 A1 1/2013

OTHER PUBLICATIONS

International Search Report and Written Opinion of the International Searching Authority for PCT/US2014/29081.

*Primary Examiner* — Joseph Rocca
*Assistant Examiner* — Marc A Scharich
(74) *Attorney, Agent, or Firm* — McNair Law Firm, P.A.; Douglas W. Kim

(57) ABSTRACT

The invention is directed towards a scooter comprising a frame, a front wheel carried by the frame, a rear wheel carried by the frame, a pair of reciprocating pedals attached to the frame, a drive assembly for transferring force from the reciprocating pedals to the rear wheel comprising: a pedal cam having a plurality of openings at various distances from the rotational center of the pedal cam; a drive pin extending from one of the reciprocating pedals and is received on one of the openings; and, a gear shifting cable attached to the drive pin causing the drive pin to engage with one of the openings so that the pedal cam is rotated by the movement of the pedal so that based upon the opening engaged, the rotational power output that the pedal cam ultimately exerts on the rear wheel is varied.

6 Claims, 16 Drawing Sheets

(56) References Cited

U.S. PATENT DOCUMENTS

| | | | |
|---|---|---|---|
| 2009/0200768 A1* | 8/2009 | Armand et al. | 280/221 |
| 2010/0167854 A1* | 7/2010 | Mercat et al. | 474/78 |
| 2010/0320718 A1* | 12/2010 | Buchberger | 280/221 |
| 2011/0057411 A1* | 3/2011 | Scolari et al. | 280/221 |
| 2013/0168942 A1* | 7/2013 | Musgrove | 280/210 |

* cited by examiner

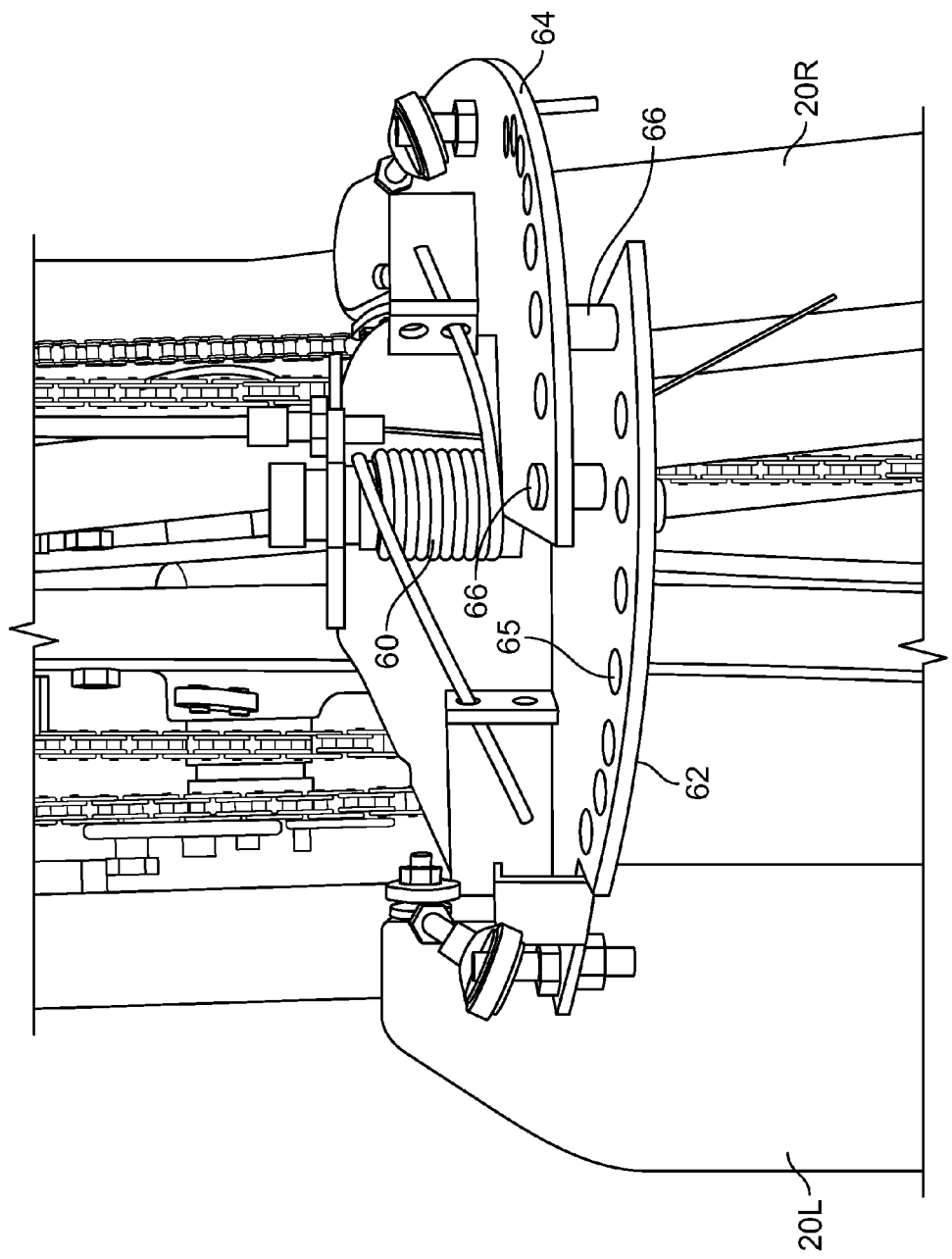

SCOOTER HAVING A GEARING SYSTEM

BACKGROUND OF THE INVENTION

1) Field of the Invention

This invention is directed to rider propelled scooter that uses a pair of reciprocating foot pedals for propulsion. More particularly, this invention relates to a gearing system.

2) Description of Related Art

This invention provides a new and novel method of using a cam drive system to provide a more compact, variable speed drive system for use on a scooter using reciprocating foot pedals.

SUMMARY OF THE INVENTION

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

This invention is directed to a scooter comprising a frame, front wheel carried by the frame, rear wheel carried by the frame, a pair of reciprocating pedals attached to the frame, a drive assembly for transferring force from the reciprocating pedals to the rear wheel comprising: a pedal cam having a plurality of openings that can have various distances from the rotational center of the pedal cam; a drive pin extending from one of the reciprocating pedals and is received on one of the openings; and, a gear shifting cable attached to the drive pin causing the drive pin to engage with one of the openings so that the pedal cam is rotated by the movement of the pedal so that based upon the opening engaged, the rotational power output that the pedal cam ultimately exerts on the rear wheel is varied.

The scooter can include a duplexer having an upper gear shift wire carried by a radiused cam attached to a lower gear shift wire so that when the radiused cam is rotated by the upper gear shift wire, the lower gear shift wire puts tension on the drive pin disengaging the drive pin from the pedal cam.

The scooter can include a motion saver carried by the scooter having: a first piston assembly having an internal piston, housing, first spring and piston member; a second piston assembly having a housing for receiving the piston member of the first piston assembly and containing a second spring; a spring biased tensioned cable connecting the first piston assembly to a gear shift cable; the motion saver includes a first position where the first and second spring are in equilibrium, a second position where the second spring is compressed and a third position where the first spring is compressed; and wherein as the drive moves relative to the pedal cam, the distance between the drive pin and the second piston is lessened allowing the drive pin to move in increments along the pedal cam.

The scooter can include a motion saver carried by the scooter having: a fixed arm pivotally attached to a pivot arm, wherein the pivot arm is attached to the drive pin; a spring biased cable attached to the fixed arm and a gear shift; a spring biased to keep the arms parallel; wherein when the gear shift is actuated, the pivot arm pivots with a distal end upwards causing the distance between the drive pin and the pivot arm to vary the distance between the rotational power output that the pedal cam ultimately exerts on the rear wheel is varied.

The scooter can include a motion saver carried by the scooter having: a shifting pin connected to a gear shifter; a block attached to the shifting pin by a spring and connected to the spring biased tension cable of the gear shifter; an indention defined in the block for receiving an engagement point included in the shifting pin; a cable attached to the shifting pin to remove the engagement point from the invention when the cable is pulled upwards, the dive pin moves to another opening and the tension on the spring is lessened so that the drive pin moves from opening to opening in increments.

The scooter can include a seat having: a cushioned seating area attached to a support staff carried by the frame; a quick release clamp to allow the support staff to telescope relative to the frame; a mounting bracket attached to the support staff allowing the seat to be removed from or slidably arranged along the frame; a pivot clamp included in the support staff for securing the seat in an extended position for operation and a folded position.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 4C shows a top plan view of the teeter system in accordance with an embodiment of the invention;

DETAILED DESCRIPTION OF A PREFERRED EMBODIMENT

Figure 1:
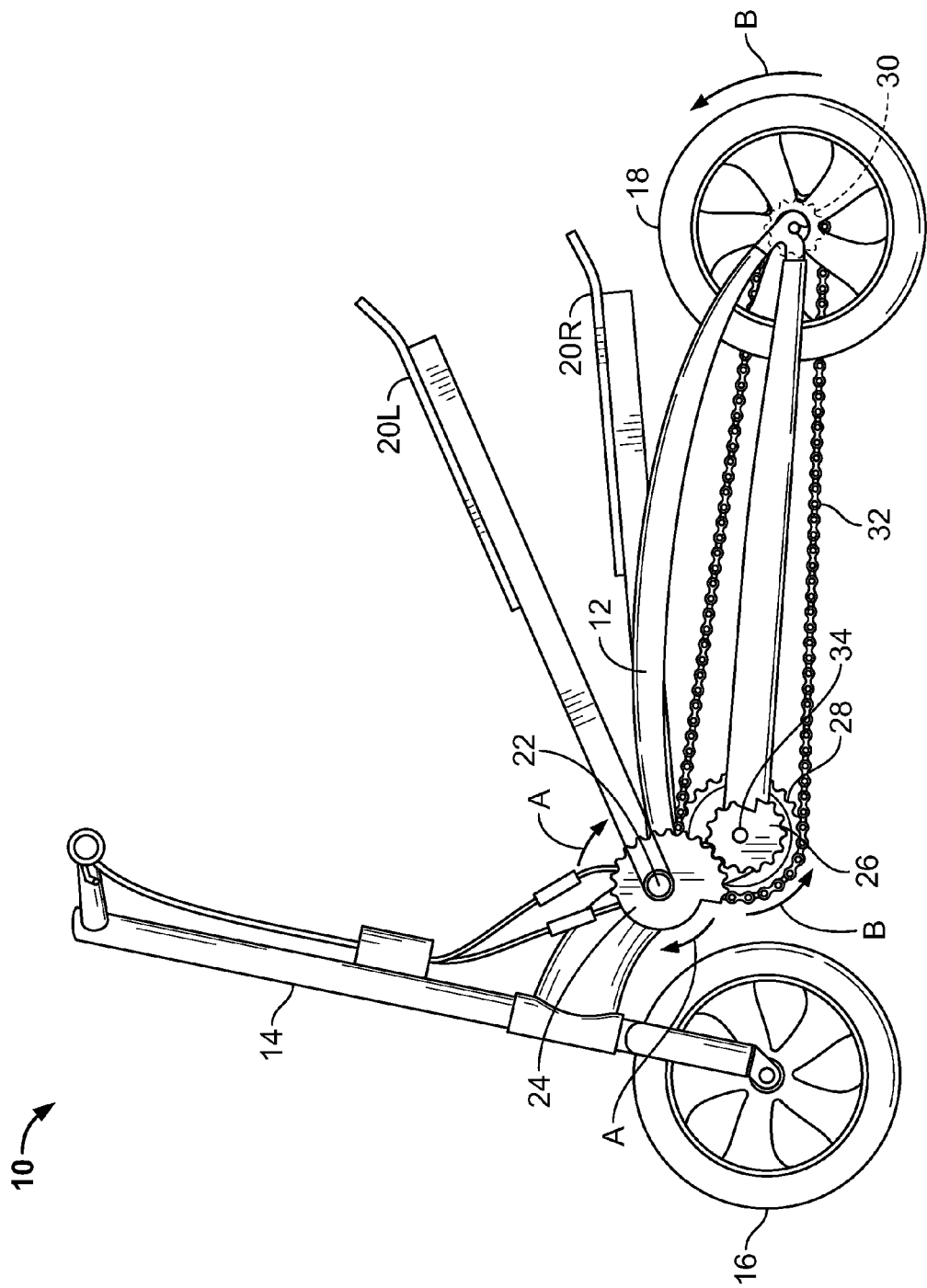
FIG. 1 shows perspective view of the invention in accordance with an embodiment of the invention.

With reference to the drawings, the invention will now be described in more detail. Referring now to FIG. 1, a scooter 10 has a frame 12 that includes a steerable handle bar assembly 14, which secures the front wheel 16 so that the user may steer the scooter. The scooter further includes a rear wheel 18 to the frame 12. The scooter includes two foot pedals 20R and 20L, which are pivotally connected to the frame by means of a hub 22. While the left pedal is not shown in FIG. 1, the pedals mirror one another and operate in a reciprocating motion, moving up and down.

As can be seen, the scooter further includes cam assembly, which comprises a pedal cam 24 and a coupling cam 26. While not shown, the scooter includes two cam assemblies on each side of the scooter that mirror one another. In the shown embodiment, the left side of the scooter further includes a drive sprocket 28 that is operably connected to a wheel sprocket 30 by a drive chain 32. In both cam assemblies, the pedal cam is rotatably connected to the hub 22 and driven by one of the respective foot pedals. In the shown embodiment, only the left cam drive sprocket is located on the left side of the scooter and is rotatably connected to the frame by an axle 34. As discussed more fully below, the coupling cam 26 from both cam assemblies rotates the axle during a down stroke of the respective foot pedals, thus, causing the drive sprocket 28 to rotate the wheel sprocket 30 and propel the scooter forward.

The pedal 20L drives the pedal cam 24 such that on a downward stroke, the pedal causes the pedal cam to rotate in direction A. The pedal cam simultaneously causes the coupling cam 26, and thus, the drive sprocket 28 to rotate in direction B, thus causing the wheel to turn in direction B. While not shown, the scooter further includes a spring loaded, one way clutch that is disposed on the axle 34 so that when the pedal 20L is in an upstroke and the directions of the pedal cam 24 and the coupling cam 26 are reversed, the clutch spins freely while the axle 34 is rotated by the opposite pedal. Consequently, the axle only rotates in direction B and only in response to the down stroke of either of the foot pedals. The axle's rotation is completely unaffected by the upstroke of either foot pedal.

Figure 2:
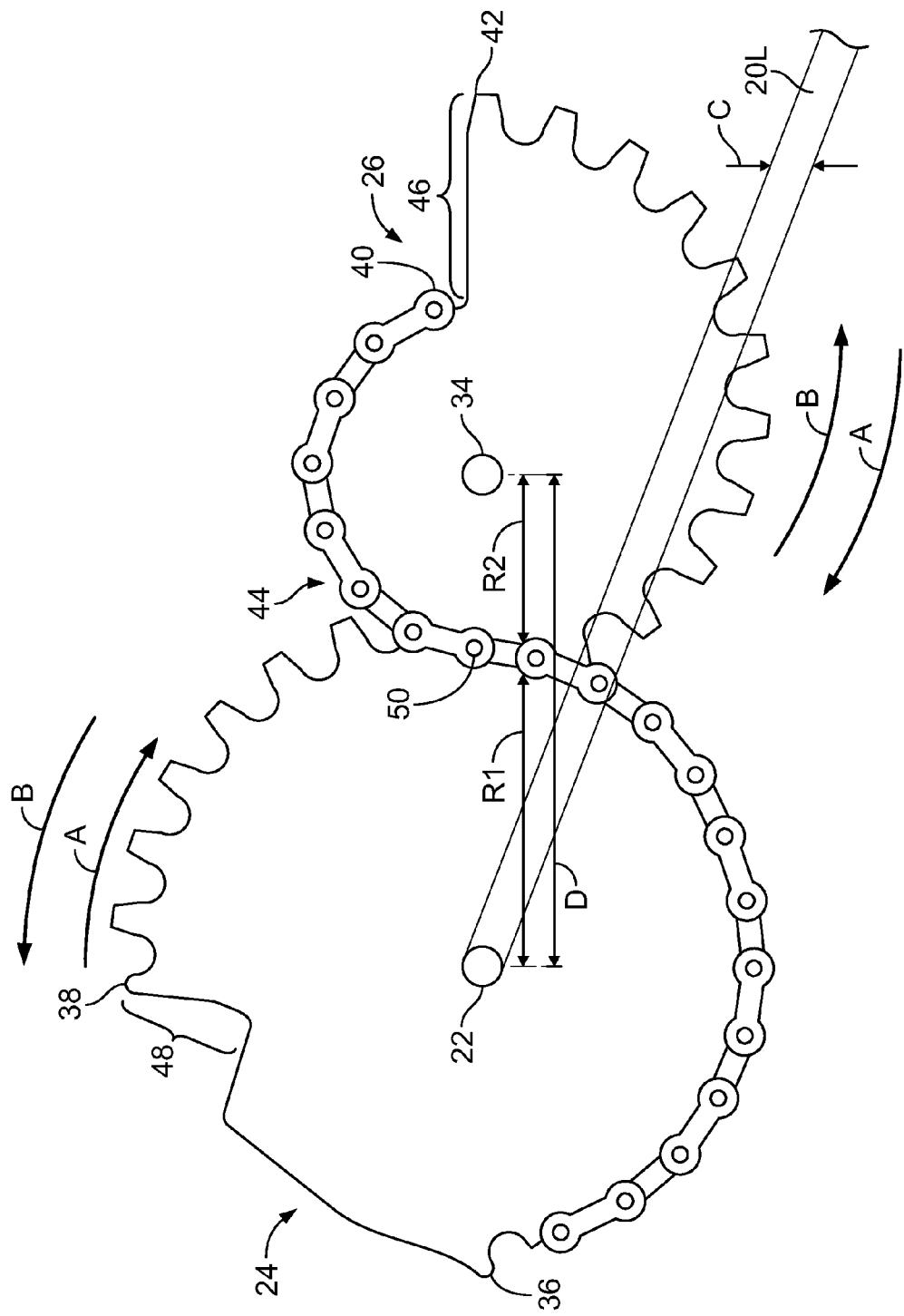
FIG. 2 shows a side elevation view of the pedal cam and coupling cam in accordance with an embodiment of the present invention.

Referring now to FIG. 2 the cam assembly, which comprises the pedal cam 24, which is rotatably mounted on hub 22 and the coupling cam 26, which is rotatably mounted on Axle 34, can be seen more clearly. As discussed above, the scooter includes two cam assemblies, one of which is driven by the left foot pedal 20L and one which is driven by the right foot pedal 20R. The structure and operation of both cam systems is identical. Accordingly, only one cam system will be discussed.

Both the pedal cam 24 and the coupling cam 26 have sprocket teeth disposed along less than 360 degrees around their circumference up to many times their circumference. Additionally, pedal cam and coupling cam have the same number of sprocket teeth disposed around their perimeter to ensure that they can engage the chain 44 throughout their rotation. Moreover, the pedal cam 24 has an aspheric radius such that when moving in direction A, the radius, as measured from the hub 22 decreases. In one embodiment, the distance between hub 22 and first sprocket 36 is half the distance between hub 22 and last sprocket 38.

In the shown embodiment, coupling cam 26 has sprocket teeth disposed around the entire circumference of the cam. However, first sprocket 40 and last sprocket 42 are laterally spaced from one another.

Pedal cam 24 and coupling cam 26 are operatively connected to one another by a chain 44 or gear teeth. In the shown embodiment, one end of the chain is connected to the first full sprocket 36 of the pedal cam and the other end of the chain is connected to the first sprocket 40 of the coupling cam. As foot pedal 20L engages in a downward stroke (direction C) the pedal cam 24 is caused to rotate in direction A. Thus, the chain causes coupling cam 26 to rotate in direction B. The cams have the ability to rotate in their respective directions until the pedal cam has rotated 360 degrees thus causing the lip 46 of pedal cam to engage the lip 48 of the pedal cam at the point of contact 50. Alternatively, the cams can rotate in the opposite direction until the first sprocket 40 of the coupling cam engages the last sprocket 38 of the pedal cam at the point of contact 50.

When the cams rotate with respect to one another the distance D between the hub 22 and the axle 34 remains constant. However, because each of the cams has an aspheric curvature caused by the change in the radius as measured from the hub and axle respectively, the ratio between R1 and R2 changes. This change in the ratio of R1 and R2 as the cams rotate causes there to be a difference in the rotational power output of the coupling cam depending on what portion of the cams engage at the point of contact 50. In at least one embodiment, when the first sprocket tooth 36 of the pedal cam is engaging the last tooth 42 of the coupling cam at the point of contact 50, the ratio of R1/R2 is 1:1. Thus, a rotation of the pedal cam by 30 degrees will cause a rotation of the coupling cam by 30 degrees, which will in turn cause the drive sprocket (28 in FIG. 1) and thus the wheel (18 in FIG. 1) to rotate by 30 degrees.

If, however, the last sprocket 38 of the pedal cam is engaging the first sprocket 40 of the coupling cam at the point of contact 50, the ratio of R1/R2 is 3:1. In this instance, a rotation of the pedal cam 24 by 30 degrees will cause a rotation of the coupling cam 26 by 90 degrees, which will in turn cause the drive sprocket (28 in FIG. 1) and thus the wheel (18 in FIG. 1) to rotate by 90 degrees in direction B, thus propelling the scooter forward. As will be discussed more fully, below the user can vary the rotational output of the coupling cam 26 and thus the speed of the scooter by controlling which sections of the pedal cam and the coupling cam engage at the point of contact during a down stroke of a foot pedal.

As discussed above, when foot pedal 20L is engaged in an upstroke in the direction opposite of direction C, the pedal cam 24 will rotate in direction B while the coupling cam 26 will rotate in direction A. The scooter includes a clutch operatively associated with the coupling cam 26 and the drive sprocket (34 in FIG. 1) so that the rotation of the coupling cam simultaneously rotates the axle 34 and drive sprocket in direction B when the foot pedal 20L is in a down stroke but allows the coupling cam 26 to rotate freely with no affect on the axle or drive sprocket when the coupling cam is rotating in direction A. Consequently, the upstroke of the foot pedal 20L has no affect on the rotation of the drive sprocket or the rear wheel.

Figure 3:
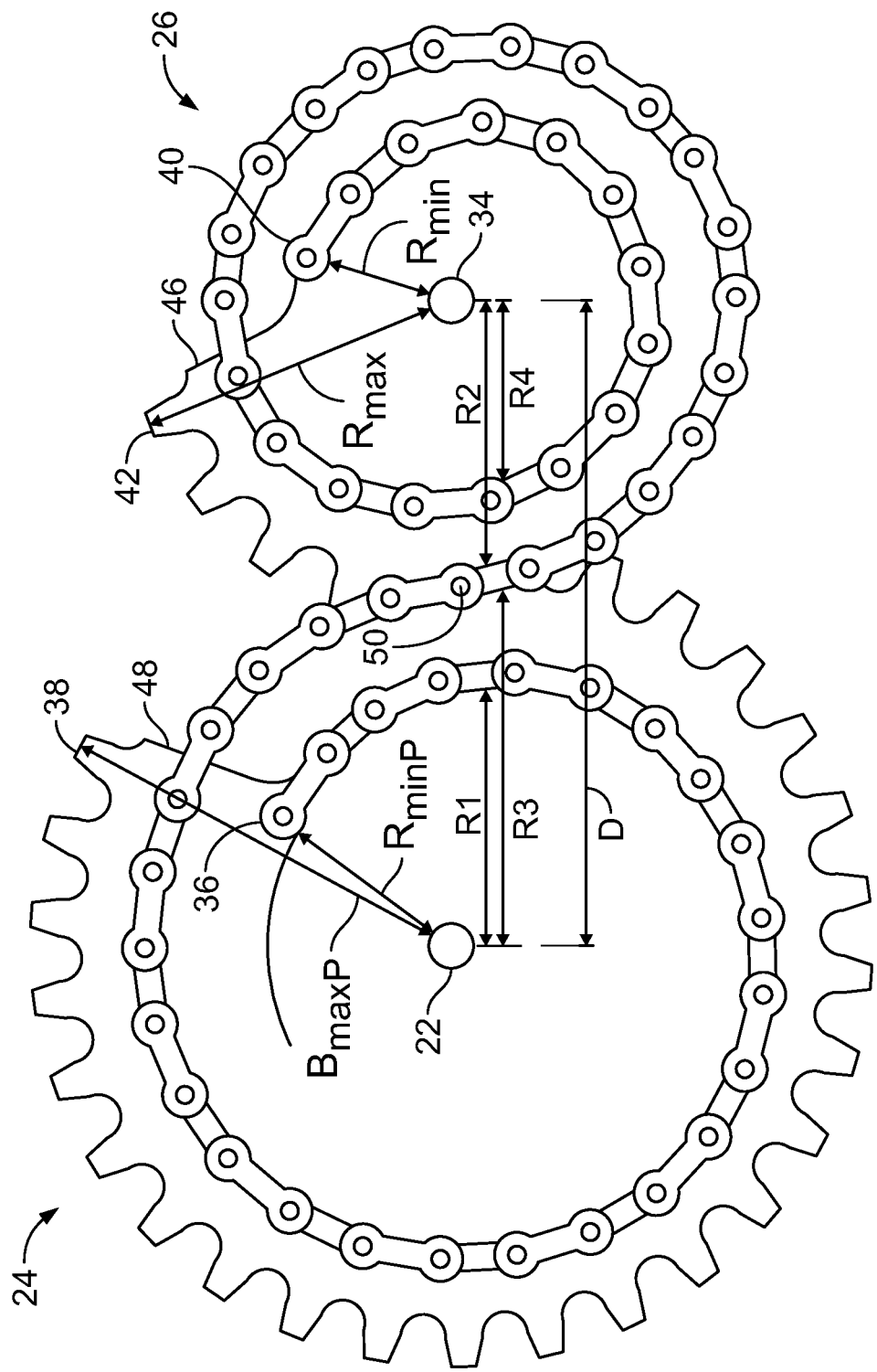
FIG. 3 shows a side elevation view of the pedal cam and coupling cam in accordance with an embodiment of the present invention.

Referring now to FIG. 3, an alternate arrangement for the cam assembly may be seen. The pedal cam 24 has sprocket teeth that extend around the entire circumference of the cam in a helical fashion such that the first sprocket 36 of the pedal cam has the smallest radius $R_{min}$ from the hub 22 and the least lateral distance from the frame of the scooter while the last sprocket 38 has the greatest radius $R_{max}$ from the hub and the greatest lateral distance from the frame. Thus, the pedal cam 24 has a conical shape where the narrowest part of the cone faces towards the frame. In this embodiment, pedal cam 24 has sprocket teeth around its entire periphery so that the coupling cam becomes a continuous side to side spiral nest.

The coupling cam 26 has sprocket teeth that are disposed around the circumference of the coupling cam creating a generally conical shape that faces in the opposite direction of the pedal cam so that the widest part of the cone faces the frame. The last sprocket 42 has the greatest radius from the axle 34 and has the least lateral distance from the frame. The first sprocket 40 has the smallest radius from the axle $R_{min}$ and has the greatest lateral distance from the frame.

This embodiment allows the pedal cam 24 to rotate 360 degrees, thus allowing the coupling cam to maximize its rotation (with the angle or rotation depending directly on the rate of change of the coupling cam's radius. This also allows the ratio between R1 and R2 to vary from 1:1 up to a maximum ratio. Thus, this embodiment also allows the user to further vary the rotational power output of the coupling cam by increasing the ratio from R1 and R2 to the ratio of R3 and R4.

Figure 4A:
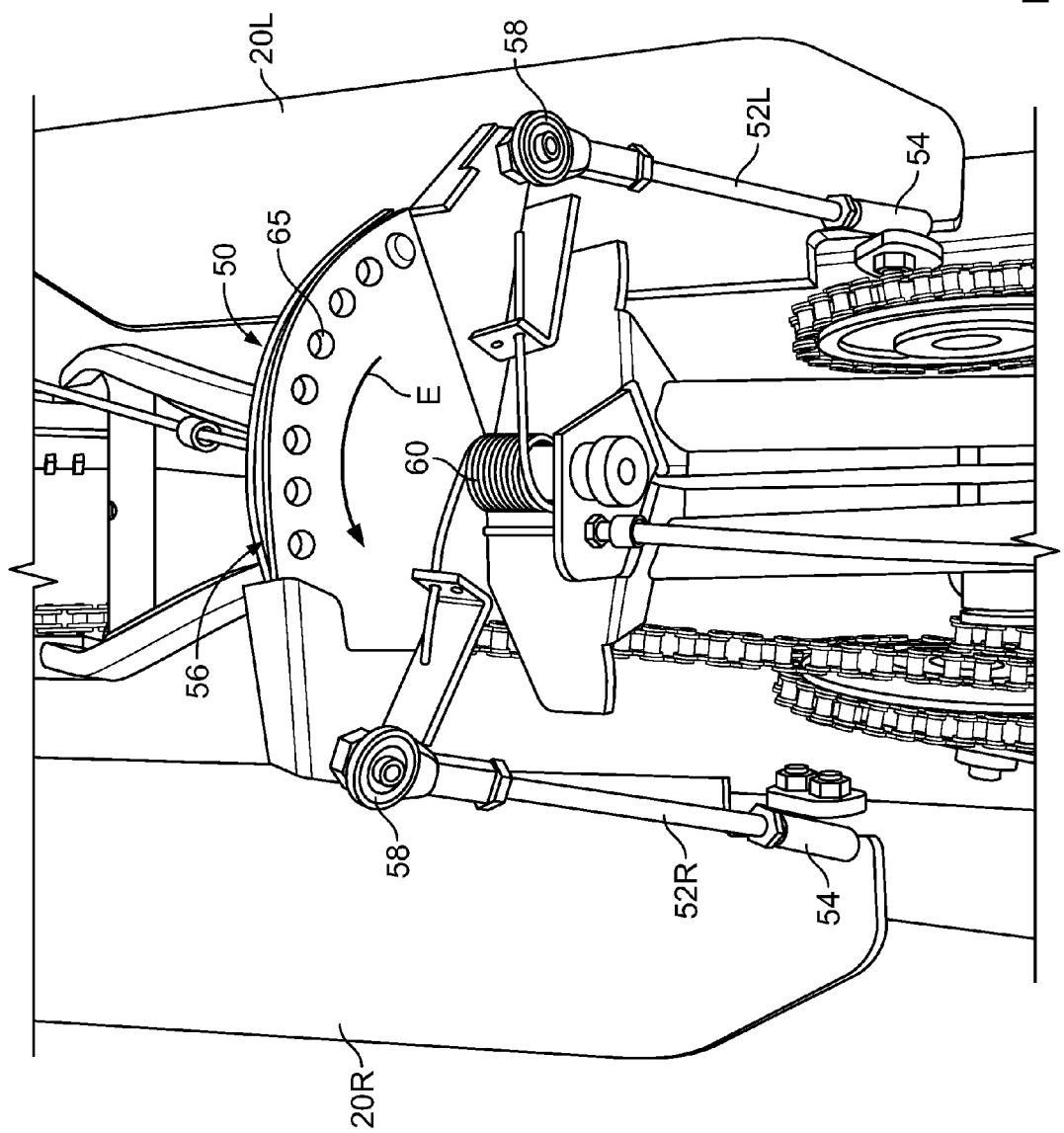
FIGS. 4A & 4B show a perspective view of the teeter system in accordance with an embodiment of the invention.
Figure 4B:
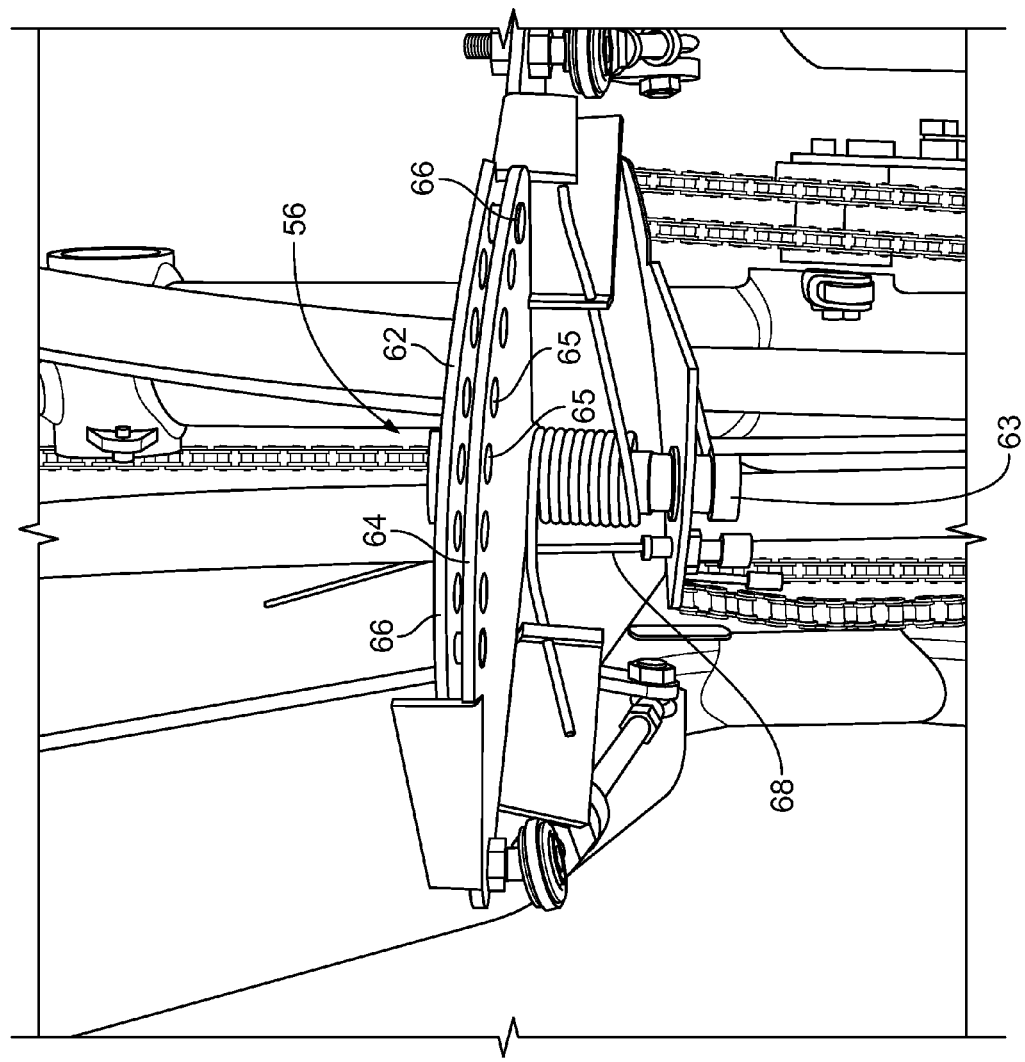

Referring now to FIGS. 4A & 4B, a teeter system that ensures that the foot pedals work in a synchronized manner while allowing the position of the foot pedals to be altered is shown. The teeter system generally show as 50 has a first arm 52L and a second arm 52R, each of which has a lower end that is pivotally connected to the foot pedals 20L and 20R at 54. Each arm further includes an upper end that is pivotally connected to a teetering member 56 at connection 58. In one embodiment, connection points 54 & 58 are ball joints. In alternate embodiments, the connection points may use any means generally known in the art such as bearings.

As the right foot pedal 20R engages in a downward stroke, teetering member 56 will rotate counterclockwise in direction E. Because the teetering member is pivotally connected to the left foot pedal, the left arm 52L will ensure that the left foot pedal engages in an upward stroke at the same rate at which the right foot pedal engages in a downward stroke. Because the foot pedals are moving in a direction that is perpendicular to the teetering member 56 the upper pivotal connections 58 pivot in a direction that is perpendicular to the lower pivotal connection points 54.

Figure 4D:
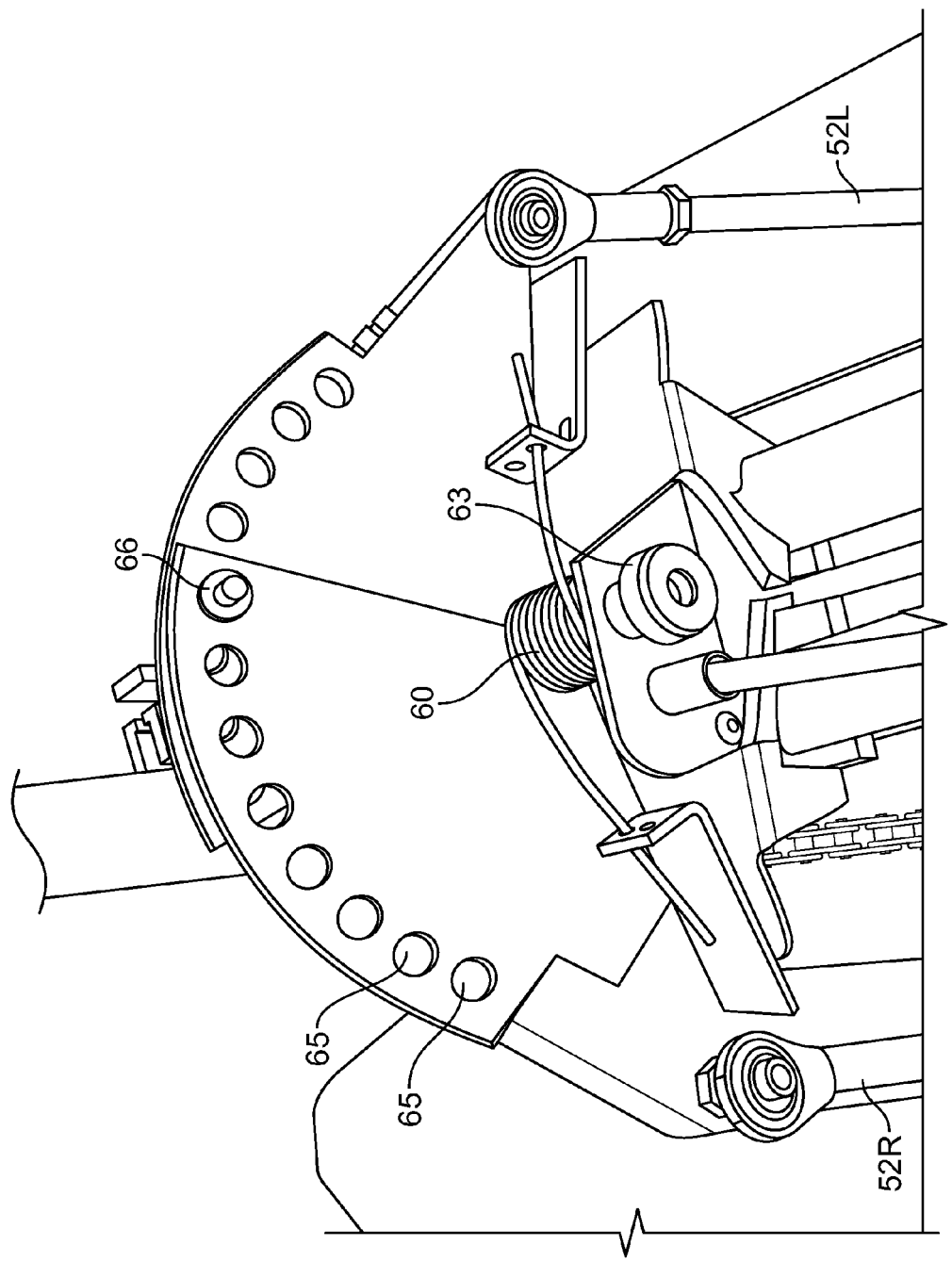
FIG. 4D shows a side elevation view of the teeter system in accordance with an embodiment of the invention.

Referring now to FIGS. 4A-4D, teetering member includes two radiused plates 62 and 64, each of which have a plurality of openings 65 that align with one another when in a resting position (as shown in FIG. 4A-4B). The radiused plates are rotatably mounted on shaft 63. Each of the radius further includes two pins 66 that are permanently disposed through one of the openings in each of the radiused plates. Pins 66 are designed to be received by the openings 65 disposed on the opposite radiused plate. In at least one embodiment, pins are disposed in the outermost openings as can be seen in FIGS. 4C & 4D. When the radiused plates are immediately adjacent to one another (as shown in FIGS. 4A-4B), these pins hold the radiused plates in place so that they cannot rotate with respect to one another. When cable 68 is engaged such that it pulls the front radiused plate 64 forward and away from the rear radiused plate 62 (as can be seen in FIGS. 4C & 4D), the pins 66 disengage the openings, allowing the radiused plates to rotate in opposite directions from one another in response to a downward pressure placed on the foot pedals (as seen in FIG. 4D). Teetering system further includes a spring 60 that biases the radiused plates to cause them to return to equilibrium (as shown in FIGS. 4A and 4B) so that each of the openings 65 align when a force is not being applied to either of the foot pedals.

If, however, a downward force is placed on the foot pedals when the radiused plates are separated as shown in FIGS. 4C & 4D, the radius plates will rotate in opposite directions, which reduces the vertical distance between the ground and the foot pedals. Once the user has found a comfortable position for the foot pedals, the tension in the cable 68 may be released so that the radiused plates return to their original position where they are generally adjacent to one another (as seen in FIGS. 4A & 4B). Once the radiused plates 62 and 64 return to their original position, the pins 66 re-engage one or more of the openings 65 so that the radiused plates 62 and 64 cannot rotate any further with respect to one another even if a downward force is applied to the foot pedals.

Figure 4E:
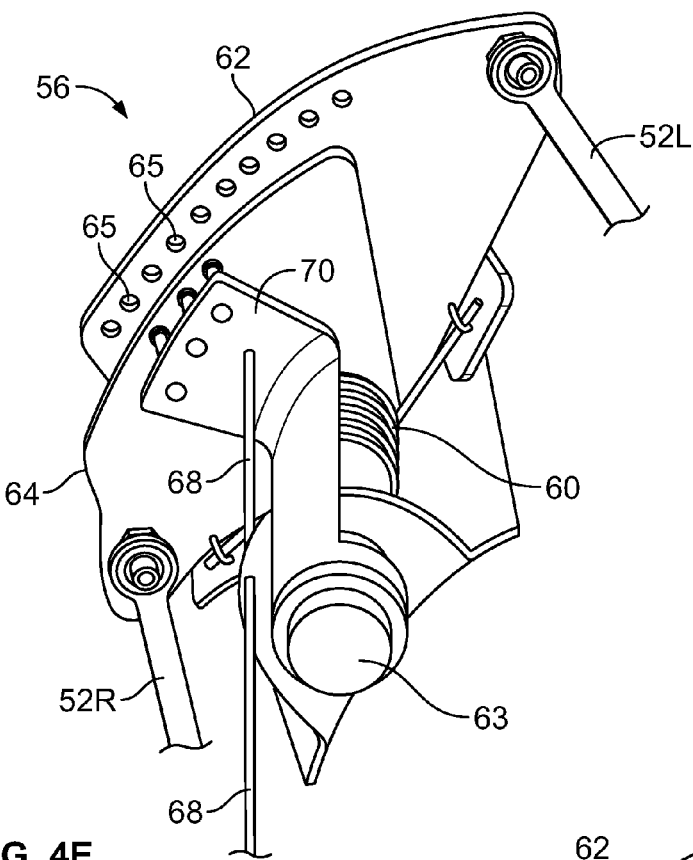
FIG. 4E shows a perspective view of the teeter system in accordance with an embodiment of the invention.
Figure 4F:
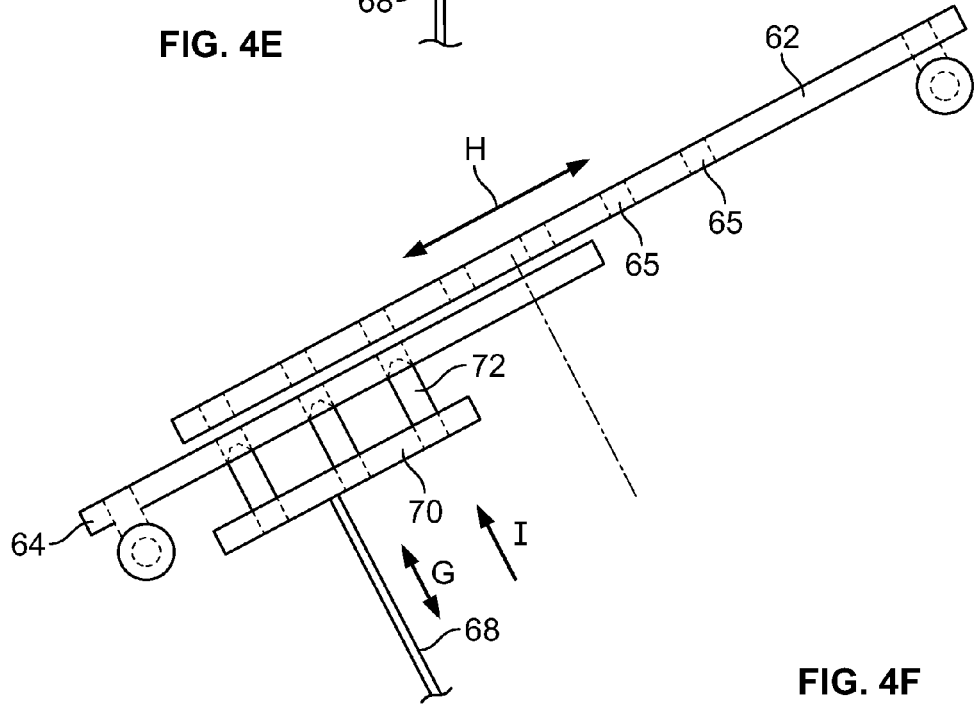
FIG. 4F shows a top plan view of the teeter system in accordance with an embodiment of the invention.

Referring now to FIGS. 4E & 4F, another embodiment of the teeter system can be seen. In this embodiment, teeter system 50 includes radiused plates 62 and 64 as well as a third smaller radiused plate 70. The smaller radiused plate is mounted on shaft 63 such that it rotates at the same rate as radiused plate 64. In this embodiment, however, radius plates 62 and 64 do not have pins that are disposed within the openings. Instead, pins 72 are disposed in smaller radiused plate 70. Pins 72 are adapted to engage openings 65 disposed in the two larger radiused plates 62, 64. When engaged, pins prevent the two larger radiused plates from rotating with respect to one another and thus keeping the foot pedals in a first location with respect to one another. When the cable 68 is engaged, the smaller radiused plate 70 is caused to move in direction G away from the two larger radiused plates, thus disengaging the pins 72 from the openings 65 disposed in the larger radiused plates 62, 64. Once the pins are disengaged, the radiused plates are allowed to rotate with respect to one another in direction H in response to a downward force placed on the foot pedals. Once the user finds a comfortable foot pedal position, the cable may be disengaged and the smaller radiused plate will move in direction I towards the two larger radiused plates, thus allowing pins 72 to reengaged openings 65 in the radiused plates. Once engaged, the teeter system 56 will operate normally to ensure that the foot pedals reciprocate in a synchronous manner.

Figure 5A:
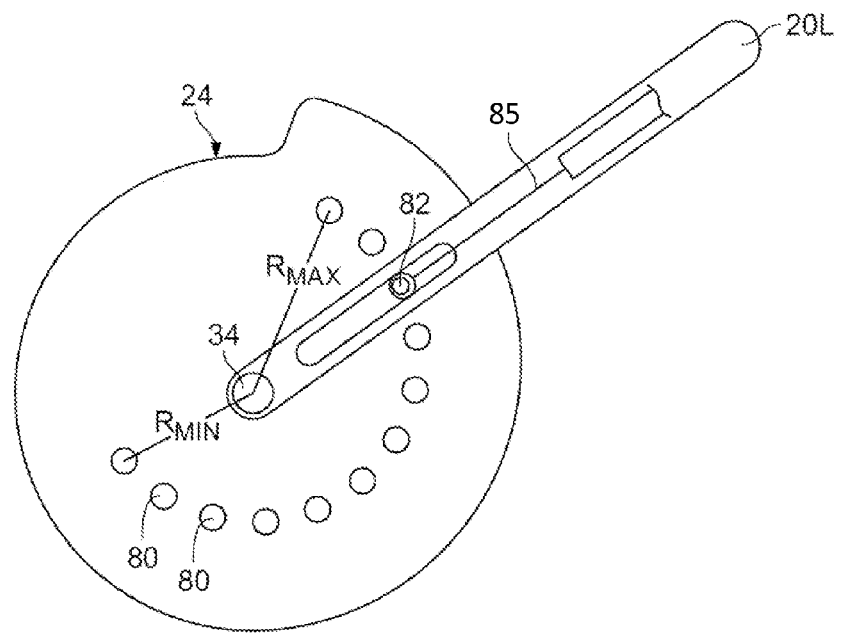
FIG. 5A shows a side elevation view of the gear shifting system in accordance with an embodiment of the invention.

Referring now to FIG. 5A, an embodiment of the gear shifting system can be seen. In a first embodiment, pedal cam 24 has a plurality of openings 80 disposed at various points around the pedal cam. These openings are adapted to receive a drive pin 82 that extends from the foot pedal 20L and engages one of the openings. When the gear shift cable 85 is disengaged, the drive pin engages one of the openings to ensure that the pedal cam is rotated with each stroke of the foot pedal. When the gear shift cable 85 is engaged, the pin is pulled away from the pedal cam and thus disengages the opening. When the pin is disengaged from the opening, its distance from the axle 34 is simultaneously changed. This change in distance ensures that the pin may only engage the gear selected as such gear has a specific distance from the axle associated with it. The foot pedal 20L may then rotate independently of the pedal cam 24. Once the drive pin is aligned with the opening 80 associated with the gear selected, the cable may be disengaged, allowing the drive pin to engage the proper opening. Once the drive pin 82 engages the proper opening 80, the pedal cam 24 is caused to rotate in response to the movement of the foot pedal 20L.

By changing the point at which the foot pedal engages the pedal cam, the user is able to change the section of the pedal cam that engages the coupling cam at the point of contact 50. As discussed in FIGS. 2 and 3, changing the section of the pedal cam 24 that engages the coupling cam 26 at the point of contact 50 changes the rotational power output that the coupling cam exerts on the drive sprocket 28. Accordingly, by changing the opening 80 that is engaged by the drive pin 82, the user can effectively change gears by changing the power output of the coupling cam and thus change the speed of the bike without changing the rate at which the foot pedals reciprocates.

Figure 5B:
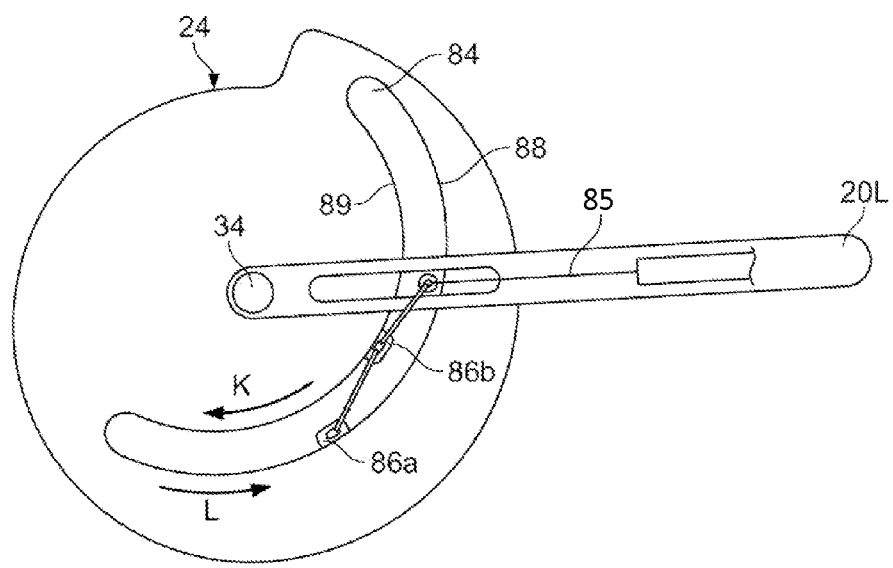
FIG. 5B shows a side elevation view of the gear shifting system in accordance with an embodiment of the invention.

Referring now to FIG. 5B, another gear changing system may be seen. In this embodiment, the openings are replaced with a channel 84 defined in the pedal cam 24. In this embodiment, the two driving pads 86a and 86b are initially in a locked position so that they may drive the pedal cam by placing pressure on the two opposing walls 88 and 89 of the channel. When in this driving position, the upper pad 86a places pressure on the first wall 88 and the lower pad 86b places pressure on the second wall 89 so that the pedal cam may be rotated. When the gear shifting cable is engaged, however, the pads are rotated so that they do not engage either wall of the channel 84 and are, therefore allowed to slide forward in direction K, placing the scooter in its lowest gear.

Figure 5C:
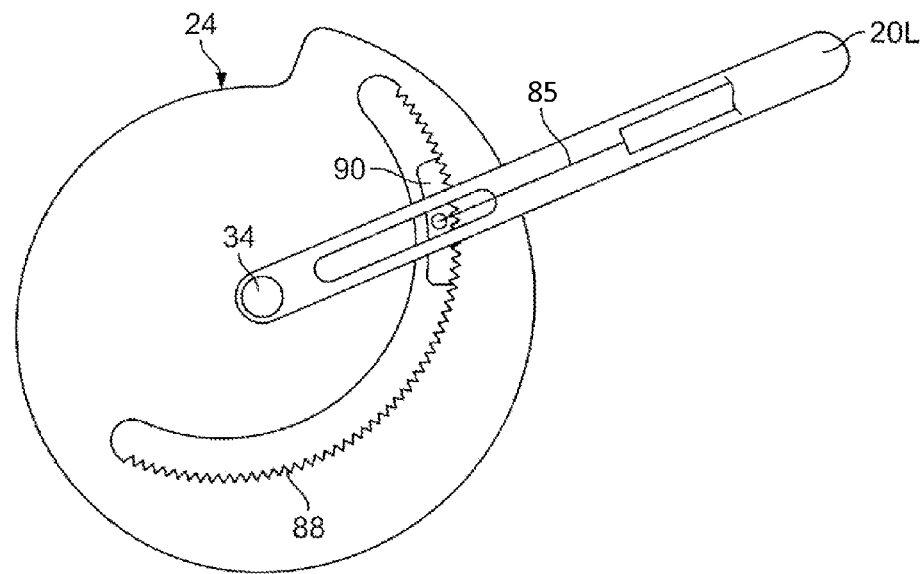
FIG. 5C shows a side elevation view of the gear shifting system in accordance with an embodiment of the invention.

Referring now to FIG. 5C, another embodiment of the gear changing system is shown. In this embodiment the first wall 88 of the channel is provided small teeth by means of knurling or the like. The surface of the drive pad 90 that contacts the channel's wall is provided with teeth adapted to engage the teeth on the first wall 88. When engaged, the drive pad engages the front wall so that the drive pad 90 does not move with respect to the front wall 88 thereby driving the pedal cam 24. When the gear shift cable is engaged, the drive pad is then pulled away from the front wall so that its teeth disengage the teeth on the front wall.

In either embodiment shown in FIG. 5B or 5C, when the user desires to shift the gear up to obtain greater rotational power output, the user must select the gear and begin pedaling the foot pedals. When the gear shifting cable is engaged, the cable is tightened, which disengages the drive pin and will pull the drive pin 82 (FIG. 5B) in the direction L. Since, however, the pedal cam 24 generally rotates 30 degrees at a time in the K direction when engaged in a down stroke, the drive pin 82 may only move a proportional distance in the L direction during an upstroke of the foot pedal. Because the foot pedals only rotate the pedal cam by approximately 30 degrees, the gears must be shifted incrementally. Moreover, the pads may not be moved while pressure is being exerted on them during the down stroke of the foot pedal. Consequently, each of the cam assemblies must change gears in an alternating fashion.

Figure 6:
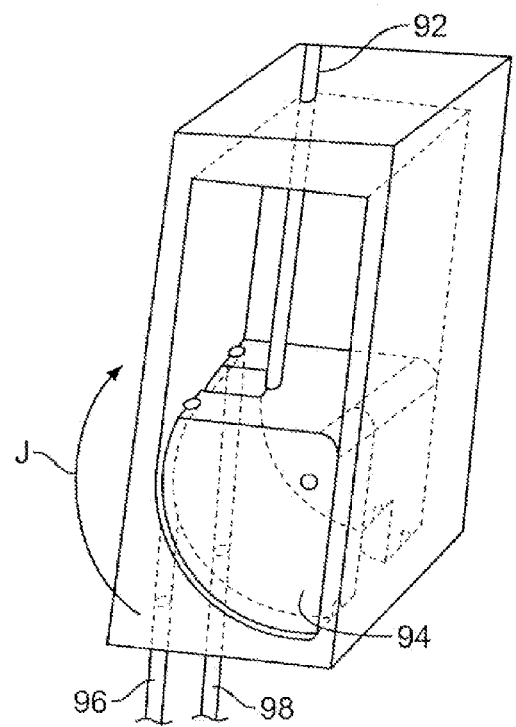
FIG. 6 shows a close up of the duplexer of the gear shifting system.

To achieve this alternating gear change, the scooter uses a duplexer (shown in FIG. 6) where a upper gear shift wire 92 engages the bottom portion of a radiused cam 94 so that when the upper gear shift wire is engaged, it rotates the cam 94 in the J direction. Two lower gear shift wires 96 and 98 are attached to the cam 94 so that when the cam 94 is rotated in the J direction the wires are pulled upwards placing tension on the drive pin 82, thus causing it to disengage the pedal cam 24. Accordingly, the user can use a single gear changer to change the gears on both cam assemblies to the same gear.

Figure 7A:
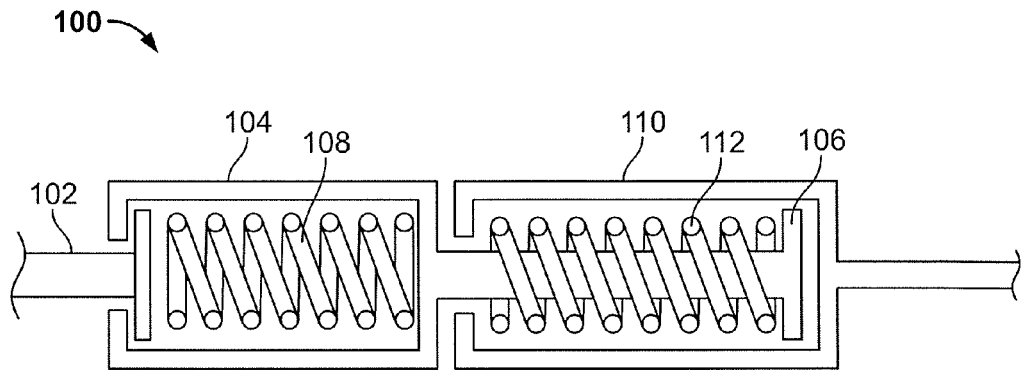
FIGS. 7A-7C show a close up of an embodiment of the motion saver of the gear shifting system.
Figure 7B:
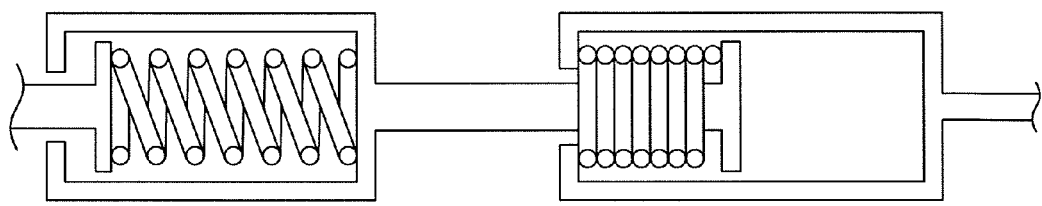
Figure 7C:
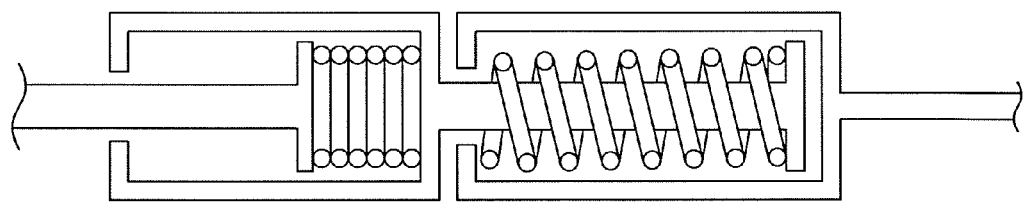

A variety of motion savers shown in FIGS. 7A through 7C can be used to change the gear to a higher level. These motion savers are necessary because the drive pin 82 cannot disengage from the pedal cam when a force is applied to it by the foot pedal. However, since only one gear shifter is being used in combination with the duplexer, the gear is directed to change on both cam assemblies at the same time. The cam assembly's gear may only be changed to a higher gear when the corresponding foot pedal is in an upstroke. Since one of the foot pedals will always be in a down stroke (while the opposite pedal is in an upstroke), only one cam assembly may change gears at a time. Hence, a mechanism that saves the energy necessary to change the gear upwards until the foot pedal is in an upstroke is necessary. The various motion savers serve this function.

Referring now to FIGS. 7A-7C, a first motion saver 100 is generally shown. The first motion saver comprises a first piston 102 attached to the cable, a housing 104 that partially encloses the piston and which forms a second piston 106, and a first spring 108 that engages the first piston and is completely enclosed in the first housing 104. The second piston 106 is partially enclosed in a second housing and extends through a spring 112 that is wrapped around the second piston. The second housing is connected to a fixed rigid cable that interconnects second housing 110 to the drive pin 82.

The first piston is attached to a spring biased, tensioned cable that interconnects the piston to the gear shift. When no gear shift has been initiated, the springs are in equilibrium as shown in FIG. 7A and the drive pin remains engaged in the pedal cam. When the gear is shifted to a higher gear, the first piston 102 is pulled to the left, causing the second piston 106 to compress the second spring 112. As the drive pin moves in the direction L (as shown in FIGS. 5A-5B) the distance between the drive pin and the second piston is lessened allowing spring 112 to decompress. Because the drive pin may only move in direction L on the upstroke of a foot pedal, the drive pin will move in increments until the second spring fully decompresses as shown in FIG. 7A, at which time the gear will be engaged.

If, however, the gear is downshifted the first piston 102 will move to the right as shown in FIG. 7C. As the drive pin moves in direction K (shown in FIG. 5), the distance between drive pin 82 and second piston 106 will become greater, thus, allowing first spring to decompress until the proper gear is achieved.

Figure 8A:
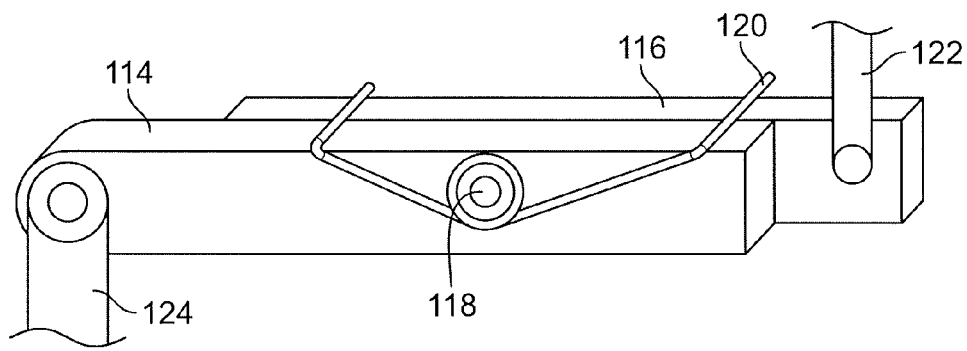
FIGS. 8A-8C show a close up of an embodiment of the motion saver of the gear shifting system.
Figure 8B:
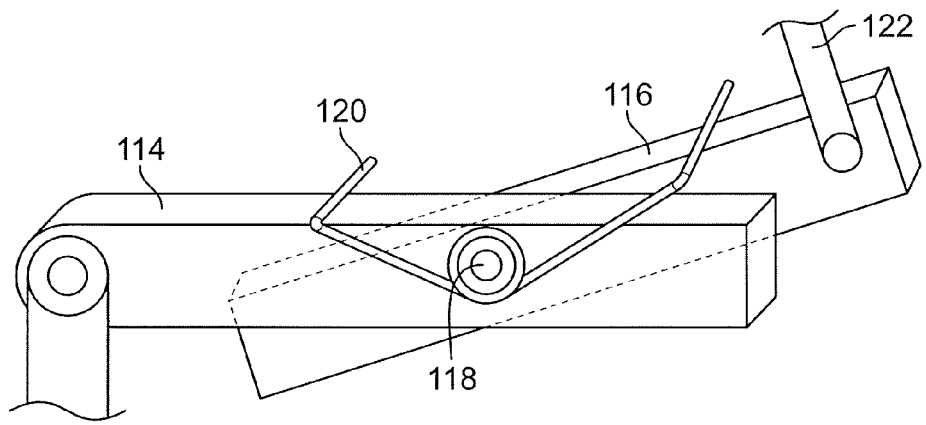
Figure 8C:
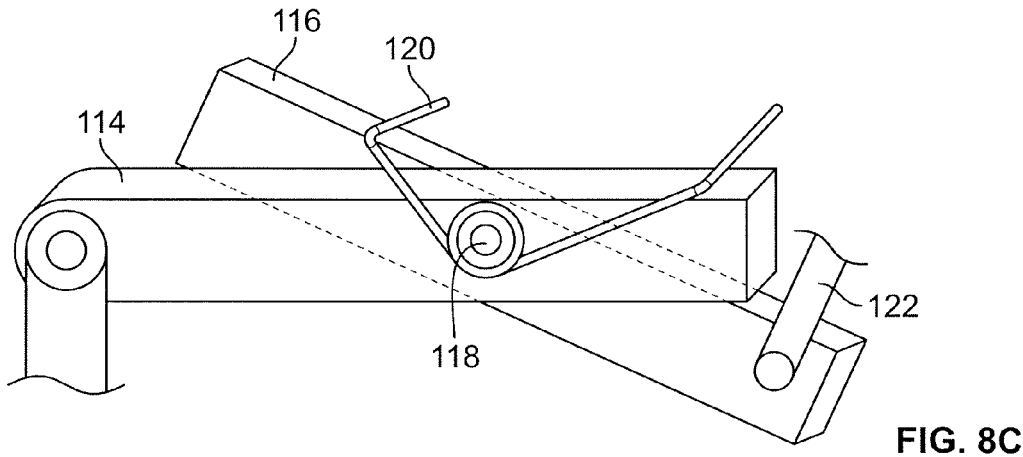

Referring now to FIGS. 8A through 8C, a second motion saver can be seen. This motion saver comprises two arms 114 and 116 that are pivotally connected at point 118. The first arm 116 is connected to the gear shift by a spring biased, tensioned cable 122. The second arm is connected to the drive pin by a fixed, rigid cable 124. The motion saver further includes a spring 120 that biases both arms to keep them in equilibrium as shown in FIG. 8. When the gear is shifted upwards, cable 122 pulls the first arm 116 upwards causing the spring to flex. As the drive pin moves in direction L, the distance between the drive pin and the second arm 114 lessens thereby allowing the spring to decompress and the first arm to return to equilibrium once the proper gear has been achieved. Again, the drive pin will only move in increments corresponding to the upstroke of the corresponding foot pedal. As shown in FIG. 8C, when the gear is down shifted, the first arm 116 is pressed down, again flexing the spring. As the drive pin moves in the direction K, the distance between the drive pin and the second arm 114 will become greater allowing the spring to decompress and the first arm to return to equilibrium.

Figure 9A:
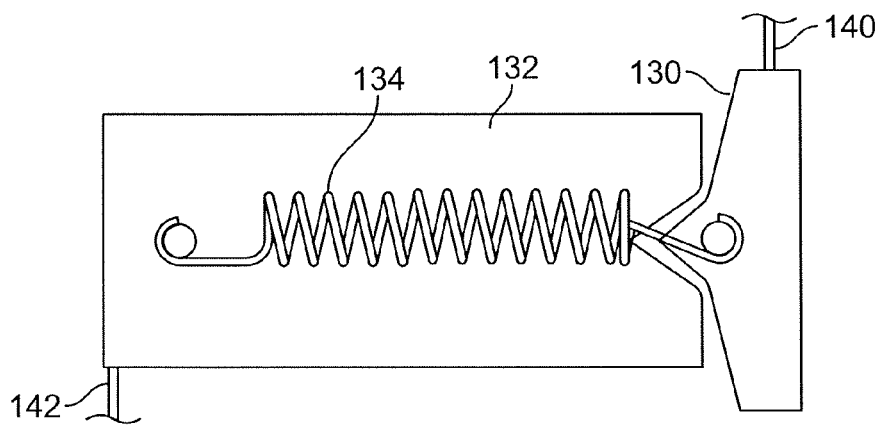
FIGS. 9A-9C show a close up of an embodiment of the motion saver of the gear shifting system.
Figure 9B:
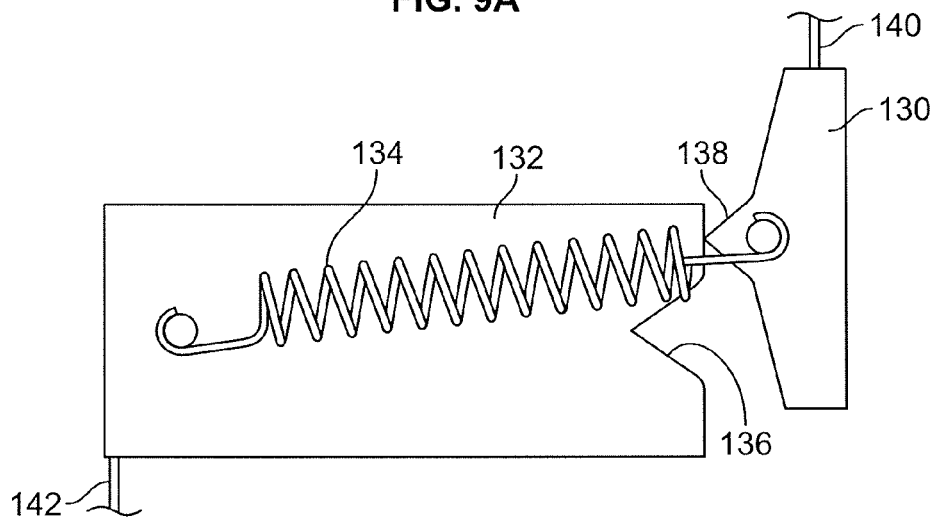
Figure 9C:
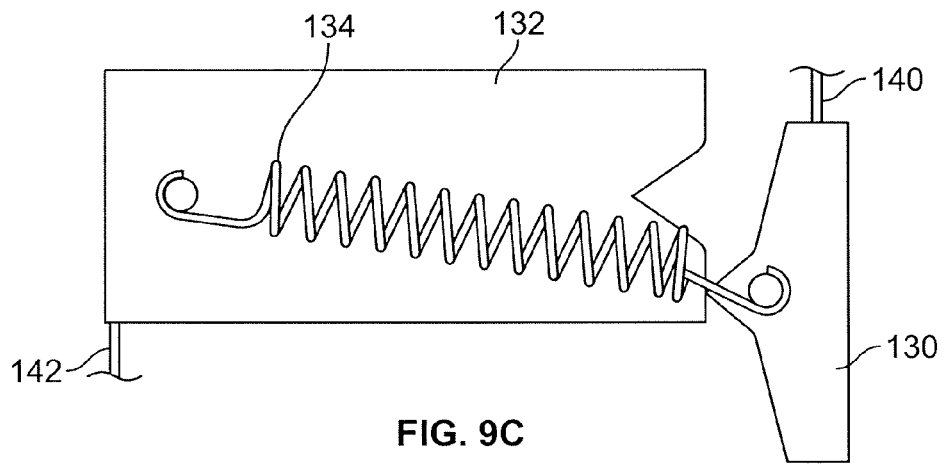

Referring now to FIGS. 9A through 9C, a third motion saver will be shown. This gear shifter comprises a shifting pin 130, which is attached to a block 132 by a spring. Notably, the block includes an indentation 136, which is adapted to receive and engage a point 138 that is disposed on the shifting pin 130. The shifting pin is connected by a spring biased, tensioned cable 140 to the gear shifter. The block is connected to the drive pin by a fixed, rigid cable 142. FIG. 9A shows this motion saver in equilibrium. If the gear is shifted to a higher gear, the shifting pin is pulled upwards by cable 140 thus flexing the spring. As the drive pin moves in direction L, the distance between the drive pin and the block 132 lessens allowing the spring to decompress and the shifting pin to return to equilibrium so that the pin engages the indentation. This is achieved once the proper gear has been achieved. Again, the drive pin will only move in increments corresponding to the upstroke of the corresponding foot pedal. If the gear is downshifted, the shifting pin will be pushed downward again flexing the spring. As the drive pin moves in the direction K, the distance between the drive pin and the block 132 will become greater allowing the spring to decompress and the shifting pin to return to equilibrium.

While the above motion savers will allow the gears to be changed in an alternating manner when the drive pin is disengaged, any spring biased mechanism that is known in the art would suffice.

Figure 10A:
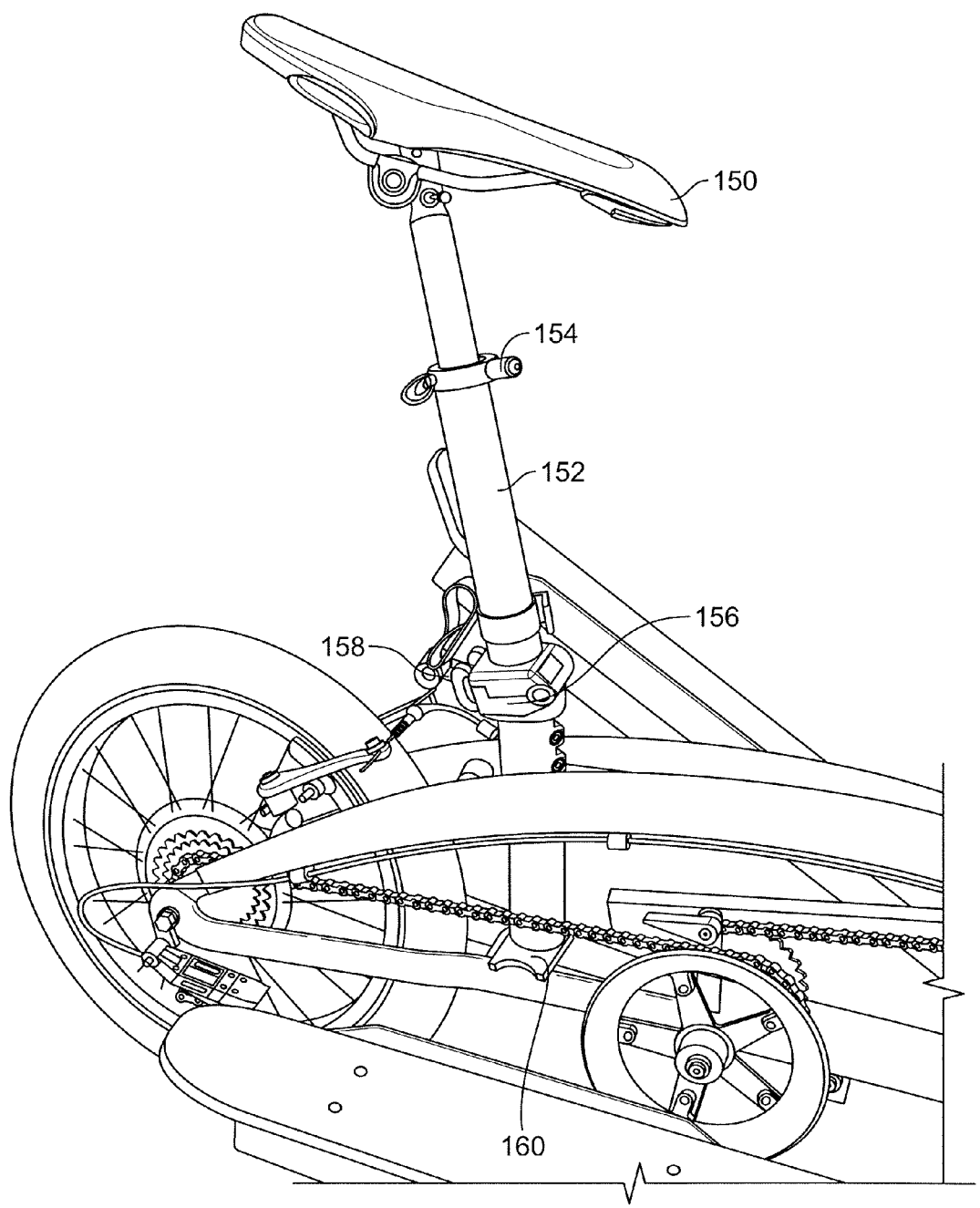
FIGS. 10A-10B show a seat according to an embodiment of the invention.
Figure 10B:
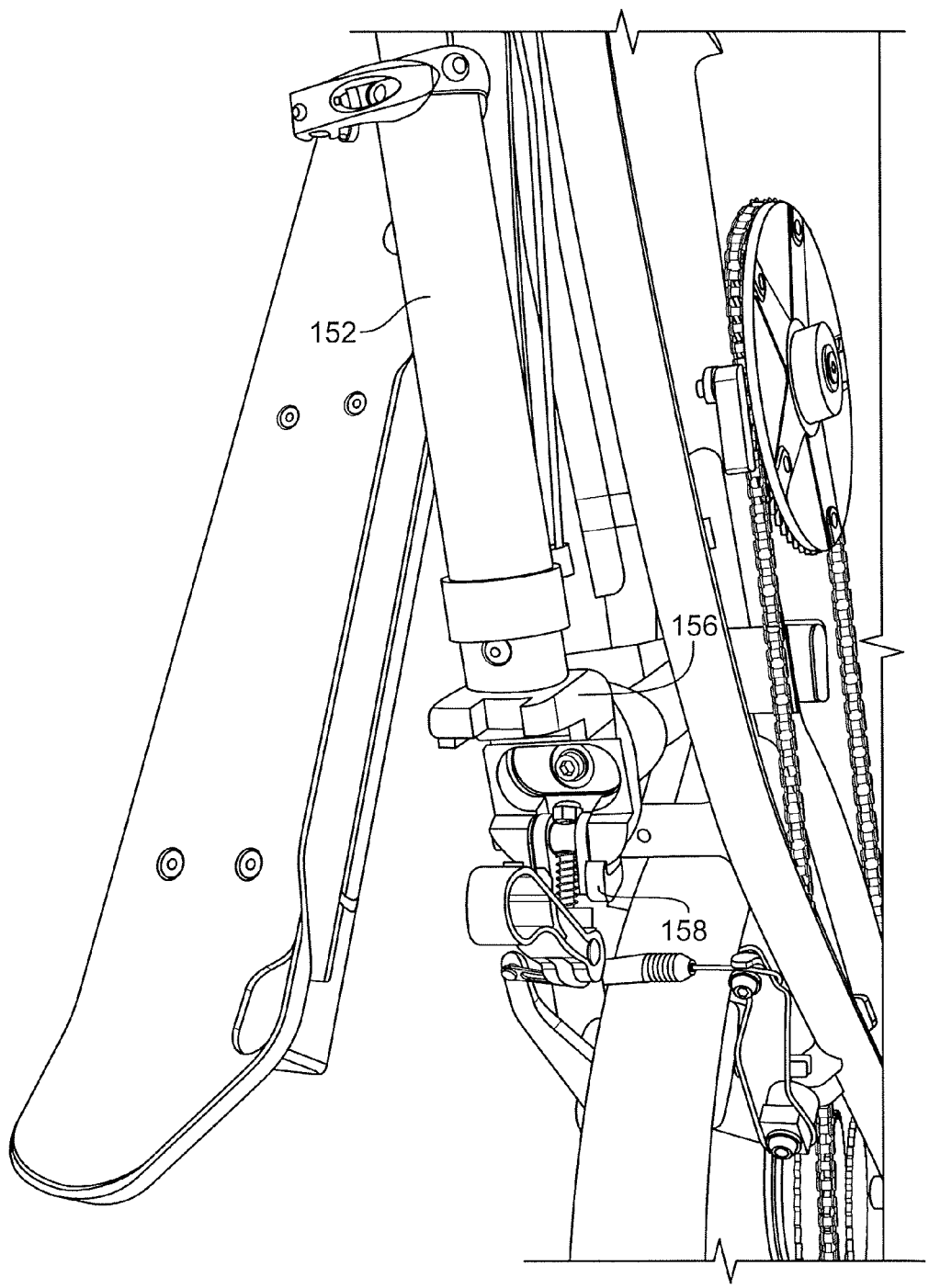

Referring now to FIGS. 10A through 10B, an adjustable, slidable, foldable, removable seat is shown. The seat comprises a cushioned seating area 150, a support shaft 152, having a quick release clamp 154 to allow the shaft to telescope, a pivoting clamp 156 having a release lever 158 and a mounting bracket 160. The mounting bracket allows the seat to be completely removed or to be slideably adjusted along the frame of the bike. The pivoting clamp includes a lip that is engaged by the release lever that is adapted to engage the lip of the clamp. Once released, the seat can fold forward towards the handle bars of the scooter.

Figure 11:
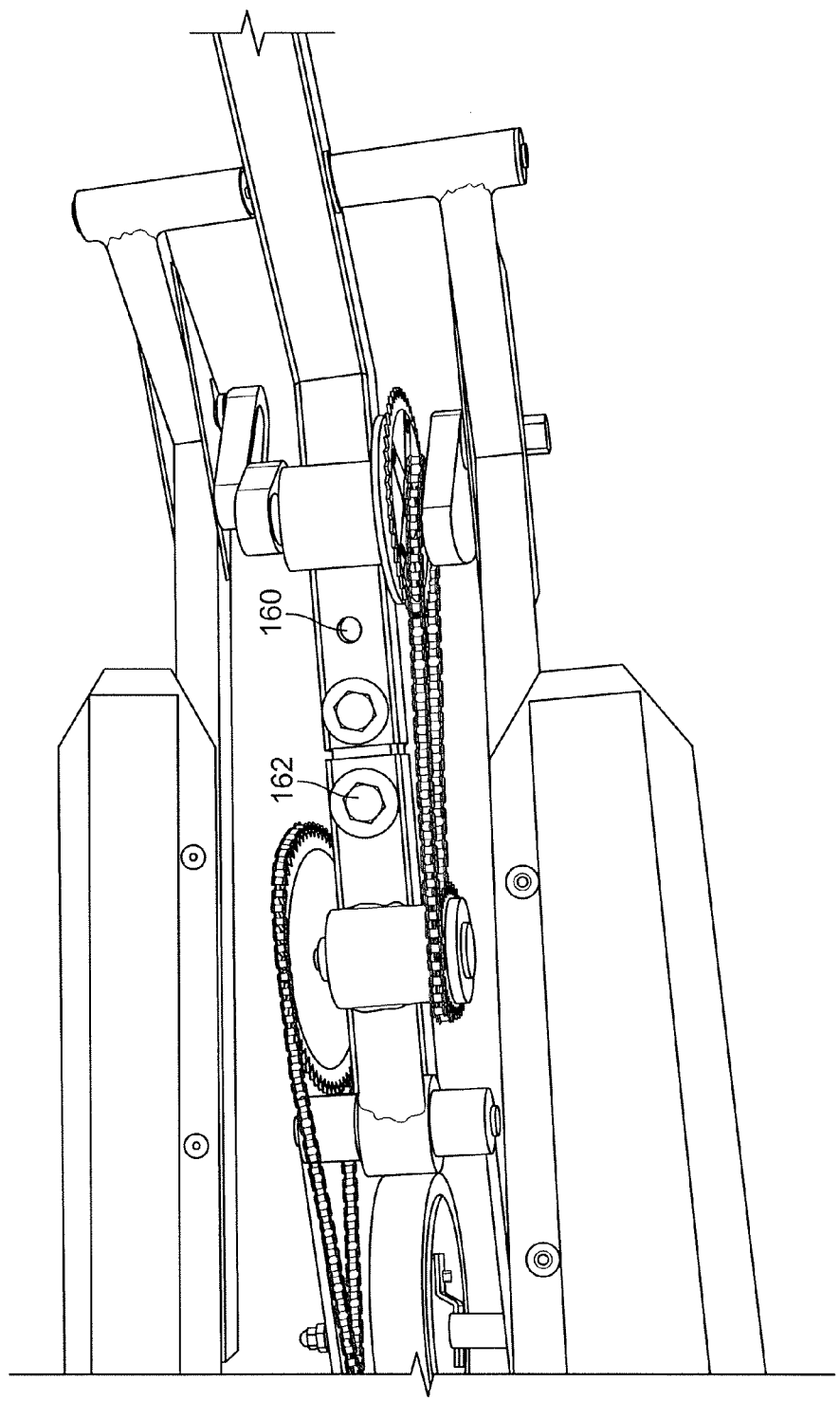
FIG. 11 shows the frame according to an embodiment of the invention.

Referring now to FIG. 11, an adjustable frame is shown. In the shown embodiment, the frame includes several openings adapted to receive a securing pin 162. Once the pins are disengaged, the openings can be realigned to lengthen or shorten the bike before the pins are reengaged with the openings. In alternate embodiments, however, clamps, friction fittings and other releasable fastening devices can be used.

While a preferred embodiment of the invention has been described using specific terms, such description is for illustrative purposes only, and it is to be understood that changes and variations may be made without departing from the spirit or scope of the following claims.

What is claimed is:

1. A scooter comprising a frame, a front wheel carried by the frame, a rear wheel carried by the frame, a pair of reciprocating pedals attached to the frame, a drive assembly for transferring force from the reciprocating pedals to the rear wheel, the drive assembly comprising:
  a pedal cam having a plurality of openings disposed at various distances from a rotational center of the pedal cam;
  a drive pin extending from one of the reciprocating pedals and configured to engage with one of the openings;
  a gear shifting cable attached to the drive pin, the gear shifting cable configured to cause the drive pin to engage with one of the openings of the pedal cam so that the pedal cam is rotated by movement of the reciprocating pedal, wherein a rotational power output that the pedal cam operably exerts on the rear wheel is varied based upon which one of the openings is engaged with the drive pin; and the scooter further comprising
  a duplexer having an upper gear shift wire carried by a radiused cam attached to a lower gear shift wire, wherein the radiused cam is configured to be rotated by the upper gear shift wire so as to operably cause the lower gear shift wire to put tension on the drive pin and disengage the drive pin from the pedal cam.

2. The scooter of claim 1 further comprising a seat having:
  a cushioned seating area attached to a support staff carried by the frame;
  a quick release clamp to allow the support staff to telescope upwards relative to the frame;
  a mounting bracket attached to the support staff allowing the seat to be removed from or slidably arranged along the frame; and,
  a pivot clamp included in the support staff for securing the seat in one of an extended position for operation and a folded position.

3. A scooter comprising a frame, a front wheel carried by the frame, a rear wheel carried by the frame, a pair of reciprocating pedals attached to the frame, a drive assembly for transferring force from the reciprocating pedals to the rear wheel, the drive assembly comprising:
  a pedal cam having a plurality of openings disposed at various distances from a rotational center of the pedal cam;
  a drive pin extending from one of the reciprocating pedals and configured to engage with one of the openings;
  a gear shifting cable attached to the drive pin, the gear shifting cable configured to cause the drive pin to engage with one of the openings of the pedal cam so that the pedal cam is rotated by movement of the reciprocating pedal, wherein a rotational power output that the pedal cam operably exerts on the rear wheel is varied based upon which one of the openings is engaged with the drive pin; and the scooter further comprising a motion saver carried by the scooter, the motion saver having:
  a first piston assembly having an internal piston, a housing, a first spring and a piston member;
  a second piston assembly having a housing for receiving the piston member of the first piston assembly and containing a second spring;
  a spring biased tensioned cable connecting the first piston assembly to the gear shifting cable; wherein
  the motion saver is configured to operate in a first position in which the first and second springs are generally equally compressed, a second position in which the second spring is more compressed than the first spring and a third position in which the first spring is more compressed than the second spring; and
  wherein as the gear shifting cable moves relative to the pedal cam, a distance between the drive pin and the second piston is lessened allowing the drive pin to move in increments along the pedal cam so that one of the openings of the pedal cam can be engaged with the drive pin.

4. The scooter of claim 3 further comprising a seat having:
  a cushioned seating area attached to a support staff carried by the frame;
  a quick release clamp to allow the support staff to telescope upwards relative to the frame;
  a mounting bracket attached to the support staff allowing the seat to be removed from or slidably arranged along the frame; and, a pivot clamp included in the support staff for securing the seat in one of an extended position for operation and a folded position.

5. A scooter comprising a frame, a front wheel carried by the frame, a rear wheel carried by the frame, a pair of reciprocating pedals attached to the frame, a drive assembly for transferring force from the reciprocating pedals to the rear wheel, the drive assembly comprising:

a pedal cam having a plurality of openings disposed at various distances from a rotational center of the pedal cam;

a drive pin extending from one of the reciprocating pedals and configured to engage with one of the openings;

a gear shifting cable attached to the drive pin, the gear shifting cable configured to cause the drive pin to engage with one of the openings of the pedal cam so that the pedal cam is rotated by movement of the reciprocating pedal, wherein a rotational power output that the pedal cam operably exerts on the rear wheel is varied based upon which one of the openings is engaged with the drive pin; and the scooter further comprising a motion saver carried by the scooter, the motion saver having:

a fixed arm pivotally attached to a pivot arm, wherein the pivot arm is attached to the drive pin;

a spring biased cable attached to the fixed arm and the gear shifting cable;

a spring biased to keep the fixed arm and the pivot arm parallel relative to each other; and, wherein when the gear shifting cable is actuated by a gear shifter device, a distal end of the pivot arm pivots upwards causing a distance between the drive pin and the pivot arm to vary the rotational power output that the pedal cam operably exerts on the rear wheel.

6. The scooter of claim 5 further comprising a seat having:

a cushioned seating area attached to a support staff carried by the frame;

a quick release clamp to allow the support staff to telescope upwards relative to the frame;

a mounting bracket attached to the support staff allowing the seat to be removed from or slidably arranged along the frame; and, a pivot clamp included in the support staff for securing the seat in one of an extended position for operation and a folded position.

\* \* \* \* \*